United States Patent

[11] 3,593,714

| [72] | Inventor | James Lyon<br>2922 Qualtraugh St., San Diego, Calif. 92106 |
|---|---|---|
| [21] | Appl. No. | 825,750 |
| [22] | Filed | May 19, 1969 |
| [45] | Patented | July 20, 1971 |

[54] HAND-HELD BEAK TRIMMER AND VACCINATOR
4 Claims, 8 Drawing Figs.

[52] U.S. Cl. .................................................. 128/253,
128/303.1, 30/140
[51] Int. Cl. ........................................................ A61b 17/20,
A61d 7/00
[50] Field of Search........................................... 128/253,
303.1, 305, 318, 303.14, 303, 355, 362, 306, 325;
30/140, 188, 28

[56] References Cited
UNITED STATES PATENTS

| 3,117,578 | 1/1964 | Helbling | 128/303.14 |
| 3,136,315 | 6/1964 | Lyon | 128/303.1 |
| 3,302,645 | 2/1967 | Lockmiller | 128/223 |
| 3,463,155 | 8/1969 | Lyon | 128/303.1 |
| 3,502,079 | 3/1970 | Simmons et al. | 128/253 |

FOREIGN PATENTS

| 837,141 | 6/1960 | Great Britain | 128/305 |

*Primary Examiner*—Richard A. Gaudet
*Assistant Examiner*—J. C. McGowan
*Attorney*—Knox & Knox ABSTRACT: A hand-held unit with which the beak of a chicken, or other such bird, can be trimmed and cauterized simultaneously with the application of a dose of vaccine, by a single squeezing action of the hand. The beak-trimming elements are adjustable to the most convenient position for a particular operator, and also to provide a choice of trimming or cutting actions. The vaccination apparatus is carried entirely on the hand-held unit and the only accessory equipment required is a low voltage power supply for the resistance-heated trimming blade.

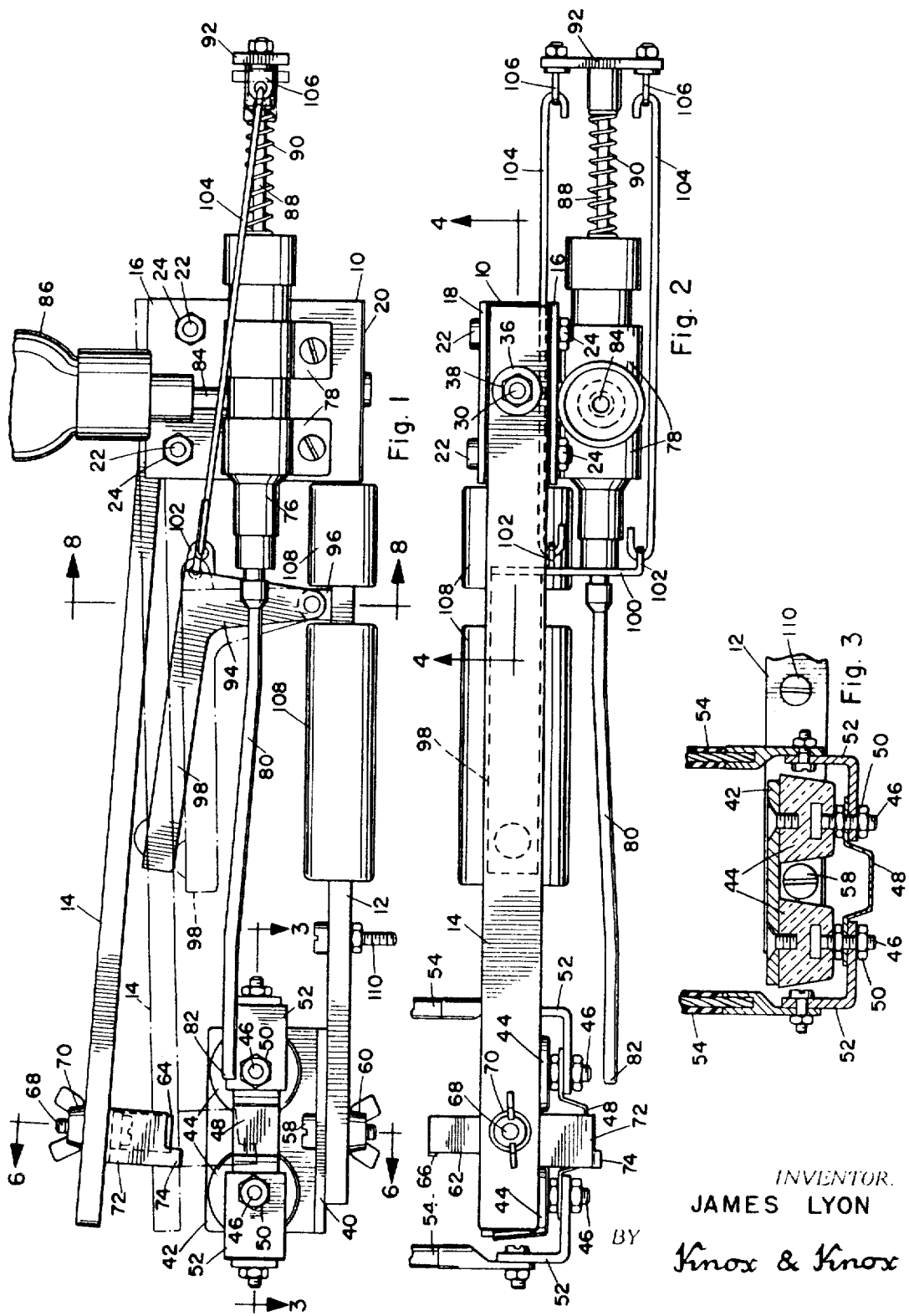

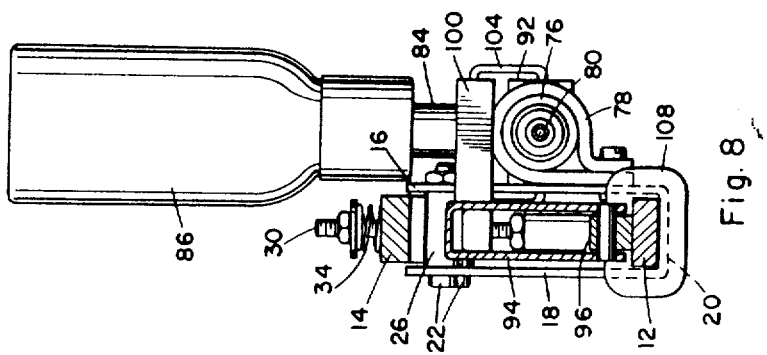
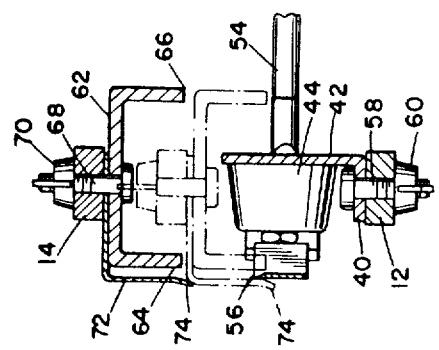
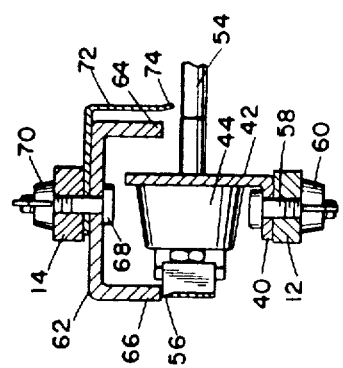
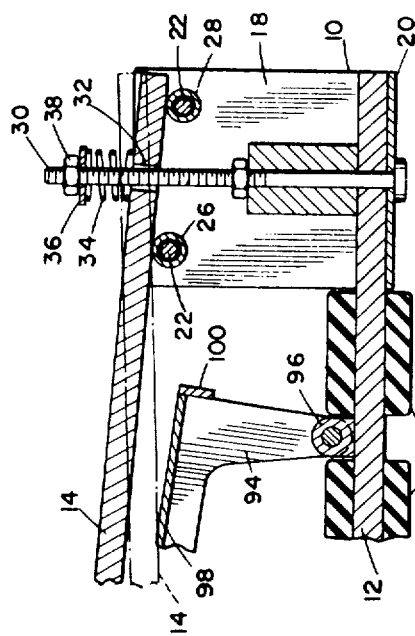
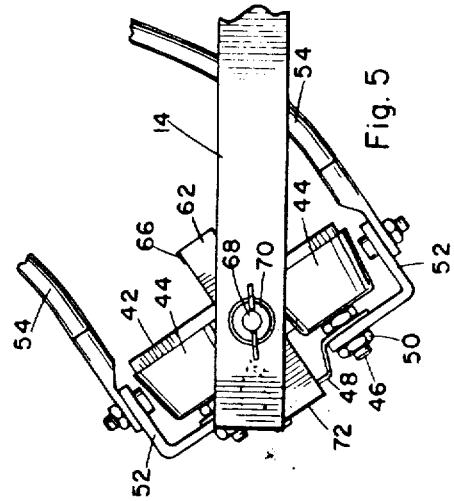
INVENTOR.
JAMES LYON
BY Knox & Knox

HAND-HELD BEAK TRIMMER AND VACCINATOR

BACKGROUND OF THE INVENTION

The present invention relates to farm equipment and specifically to a hand-held beak trimmer and vaccinator.

Chickens and other such farm birds commonly have their beaks trimmed to prevent cannibalism, feather picking and other nervous habits. Machines for this purpose are usually mounted on a bench or stand and are operated by a foot pedal while the operator holds a bird with its beak on a support or anvil for cutting. Some machines also include means for vaccinating the bird at the time the beak is cut, by injecting vaccine into the mouth. This requires the beak to be open while cutting, or must be a separate operation just before or after the cutting action.

SUMMARY OF THE INVENTION

The apparatus described herein is a simple hand-held unit, actuated by squeezing, to trim and cauterize a bird's beak while simultaneously applying a dose of vaccine into the bird's eye, which does not interfere with the beak treatment. Trimming is preformed by a heated blade which cauterizes the beak while being pressed against an anvil element, with a choice of shearing or cutting actions. The blade and anvil elements are adjustable to any suitable position for the individual operator and the only external connections are to a low voltage power supply for heating the blade, the vaccination means being self-contained on the hand unit.

BRIEF DESCRIPTION OF THE DRAWINGS

FIG. 1 is a side elevation view of the hand-held unit;
FIG. 2 is a top plan view thereof;
FIG. 3 is a sectional view taken on line 3-3 of FIG. 1;
FIG. 4 is a sectional view taken on line 4-4 of FIG. 2;
FIG. 5 is a top plan view, similar to a portion of FIG. 2, showing the blade assembly offset at an angle;
FIG. 6 is a sectional view taken on line 6-6 of FIG. 1;
FIG. 7 is a sectional view similar to FIG. 6 but showing an alternative trimming action; and
FIG. 8 is a sectional view taken on line 8-8 of FIG. 1.

DESCRIPTION OF THE PREFERRED EMBODIMENT

The hand-held unit comprises a frame 10 with an elongated rigid support bar 12, and a movable pressure bar 14 vertically spaced from and coextensive with the support bar. Frame 10 is generally U-shaped member having spaced parallel sideplates 16 and 18, between which the the two bars are held, the support bar being fixed to the base portion 20 of the frame. For reference purposes the bars will be considered as extending forwardly from the frame. The upper ends of the sideplates 16 and 18 are separated by spacer sleeves secured by bolts 22 and nuts 24, the front spacer being a rocker sleeve 26 and the rear spacer a stop sleeve 28. Pressure bar 14 rests on top of the two sleeves and is retained by a bolt 30 extending vertically through an oversized hole 32 in the pressure bar, with a spring 34 held down on top of the pressure bar by a washer 36 and nut 38. Rocker sleeve 26 is positioned slightly higher than stop sleeve 28, so that in the rest position shown in full line in FIGS. 1 and 4, the pressure bar is slightly divergent from the support bar 12. When the bars are squeezed together the pressure bar 14 pivots on rocker sleeve 26, as indicated in broken line in FIG. 4, the squeezing pressure being controlled by nut 38 adjusting the spring 34. Pressure bar 14 fits closely between sideplates 16 and 18 and is held by them in proper alignment with the support bar 12.

On the forward end of support bar 12 is an L-shaped bracket 40, the upright wall 42 of which carries a pair of spaced insulators 44 with projecting threaded studs 46. A blade 48 is mounted on studs 46 and secured by nuts 50, with connecting lugs 52 under the nuts for connection to flexible electrical cables 54 leading to a power supply, not shown. The power supply is a conventional low voltage, high amperage type suitable for heating blade 48 through its electrical resistance. As shown, the blade has an outwardly offset portion with a sharpened upper edge 56, but the sharpening is not essential. Bracket 40 is secured to the support bar 12 by a bolt 58 and wingnut 60, which allows the blade assembly to be rotated from the longitudinally aligned position shown in FIG. 2, to a position which is suited to a particular operator. A typical alternate position is shown in FIG. 5, the actual orientation being set to suit the handgrip and technique of holding a bird.

Below the forward end of pressure bar 14 is an anvil unit 62 of inverted U-shaped, with a downwardly extending shearing anvil 64 at one end and a downwardly extending pressure anvil 66 at the other end. The anvil unit is secured by a bolt 68 and wingnut 70, the bolt being coaxial with bolt 58 when bars 12 and 14 are parallel. Anvil unit 62 is thus rotatably adjustable to align with blade 48. The shearing anvil 64 is spaced from the axis of bolt 68 to pass just inside blade 48, as indicated in the broken line position in FIG. 6. Pressure anvil 66 is spaced to meet the blade in edge to edge relation, as in FIG. 7, for a direct cutting type of action. A deflector blade 72 is secured between anvil unit 62 and the pressure bar 14, and extends in spaced parallel relation just forward of shearing anvil 64, to deflect the bird's beak during the shearing action. The lower end of deflector blade 72 has an outwardly turned tongue 74 to guide it outside the blade 48, as in FIG. 6. Mounted on sideplate 16 of the frame 10 is a syringe 76 secured by clips 78, or other suitable means. A delivery tube 80 extends forwardly from syringe 76 and has a forward nozzle end 82 positioned near blade 48, to inject fluid into the eye of a bird whose beak is held on the blade. For angularly offset positions of the blade assembly, the delivery tube would be suitably bent and positioned. Injection into the eye has been found to particularly effective and the nozzle does not require frequent adjustment, since birds are usually treated at a particular age and do not vary very much in size. The syringe 76 is a conventional multiple dose type with an inlet 84 connected to a gravity feed supply bottle 86. An actuating plunger 88 extends rearwardly from the syringe and is biased to the extended position by a return spring 90, the rear end of the plunger having a crossbar 92. Each operation of plunger 88 will thus eject a predetermined dose of vaccine from nozzle 82.

Operation of the syringe is synchronized with the beak-trimming action by means of a generally L-shaped lever 94 pivotally mounted on a bracket 96 support bar 12, and having an arm 98 extending longitudinally forward below pressure bar 14. When the pressure bar is depressed the lever 94 is tilted forwardly. On the upper rear portion of lever 94 is a transverse tie plate 100, having a pair of lugs 102 from which link rods 104 extend to lugs 106 on opposite ends of the crossbar 92. Link rods 104 pass on opposite sides of syringe 76 to equalize the pull, which moves the plunger 88 in a short stroke each time the pressure bar is depressed.

For handling comfort, thermally insulated handgrips 108 are fitted on support bar 12, and a screw 110 is fixed in the forward portion of the support bar for attachment to a hanger or suitable support when the unit is not in use.

In operation, the operator holds the unit in one hand and the bird in the other, with the bird's on blade 48 and the eye adjacent nozzle 82. One squeeze on the pressure bar 14 trims the beak and vaccinates the bird. With the heated blade the beak is burned and cauterized rather than actually cut, so the pressure required is not excessive. Since the blade will be of thin metal in order to have sufficient electrical resistance for heating, the sharpened blade may not be necessary for most birds. The anvil unit is easily set for shearing or compression action, depending on the bird and the preference of the operator. It has been found that thermal insulation is not necessary on the pressure bar, but could be added, and there is no danger of electrical shock since low voltage is used.

I claim:

1. A hand-held beak trimmer comprising:
a frame having a rigid elongated support bar;

an elongated pressure bar coextensive with said support bar and effectively pivotally connected thereto at one end;

a resistance-heated blade mounted on one end of one of said bars remote from the pivotal connection and having means for connection to a power supply;

an anvil unit mounted on the other of said bars and being interengaging with said blade when the bars are brought together; and said blade and said anvil being each rotatably adjustable about a substantially vertical common axis when the trimmer is in normal use position.

2. The structure of claim 1, wherein said anvil unit is reversible end to end, one end having a pressure anvil portion to meet the edge of said blade and the other end having a shearing anvil portion to pass the blade closely with a shearing action, the two portions being used selectively.

3. The structure of claim 1, wherein the pivotal connection of said pressure bar includes an adjustable spring and stop means normally holding the pressure bar divergent from said support bar, said spring being mounted on a bolt fixed to said support bar and extending through said pressure bar, so that the pressure bar is easily assembled and removed when necessary.

4. The structure of claim 1, and including a vaccine-dispensing means comprising a spring-pressed plunger and mounted on said frame and having a nozzle adjacent said blade, a lever pivoted on said pressure bar and operated by motion of said pressure bar and actuating said plunger to dispense a dose of vaccine simultaneously with the trimming action of said blade and anvil unit.